United States Patent
Bosenko (10) Patent No.: US 9,705,556 B2
(45) Date of Patent: Jul. 11, 2017

(54) DIFFERENTIAL CAPACITIVE ANTENNA PORTS COEXISTENCE IN WIRELESS CAPACITIVE SIGNAL RECEPTION AND TRANSMISSION SYSTEMS AND/OR WIRELESS CAPACITIVE POWER SUPPLY TRANSMISSION SYSTEMS

(71) Applicant: Rostyslav Volodymyrovych Bosenko, Kyiv (UA)

(72) Inventor: Rostyslav Volodymyrovych Bosenko, Kyiv (UA)

( * ) Notice: Subject to any disclaimer, the term of this patent is extended or adjusted under 35 U.S.C. 154(b) by 0 days.

(21) Appl. No.: 14/782,313

(22) PCT Filed: Apr. 3, 2014

(86) PCT No.: PCT/UA2014/000040
§ 371 (c)(1),
(2) Date: Oct. 2, 2015

(87) PCT Pub. No.: WO2014/163600
PCT Pub. Date: Oct. 9, 2014

(65) Prior Publication Data
US 2016/0072544 A1    Mar. 10, 2016

(30) Foreign Application Priority Data

Apr. 3, 2013   (UA) .................................. 201304180

(51) Int. Cl.
*H04B 1/44*     (2006.01)
*H04B 5/00*     (2006.01)
*H04B 5/02*     (2006.01)
*H01Q 1/36*     (2006.01)
*H01Q 1/48*     (2006.01)

(52) U.S. Cl.
CPC ................ *H04B 1/44* (2013.01); *H01Q 1/36* (2013.01); *H01Q 1/48* (2013.01); *H04B 5/0012* (2013.01); *H04B 5/0031* (2013.01); *H04B 5/0037* (2013.01); *H04B 5/02* (2013.01)

(58) Field of Classification Search
CPC ............... H04B 1/44; H01Q 1/36; H01Q 1/48
USPC .......................................................... 455/78
See application file for complete search history.

(56) References Cited

U.S. PATENT DOCUMENTS

| | | | | |
|---|---|---|---|---|
| 3,618,105 A | * | 11/1971 | Bruene | H01Q 21/28 343/747 |
| 6,304,220 B1 | * | 10/2001 | Herve | H01Q 1/242 343/700 MS |
| 8,019,304 B2 | * | 9/2011 | Liu | H04B 1/006 455/132 |

(Continued)

*Primary Examiner* — Creighton Smith (57) ABSTRACT

Disclosed are antenna ports for high-speed, short-range, capacitive wireless devices that can be used for stream data and power supply transmission between two adjacent electronic devices, modules, etc. In various embodiments, differential capacitive antenna ports for the wireless capacitive signal reception and transmission include a capacitive transmission port configured to generate electric fields that represent transmitted signals with at least one pair of transmitting terminals, with conductive working surfaces connected to the port inputs at the input feed points, and a capacitive reception port configured to detect electric fields that represent transmitted signals with at least one pair of receiving terminals, with conductive working surfaces connected to the port outputs at the output feed points.

19 Claims, 3 Drawing Sheets

(56) References Cited

U.S. PATENT DOCUMENTS

| | | | |
|---|---|---|---|
| 8,666,329 B2 * | 3/2014 | Mitomo | H01Q 3/24 327/593 |
| 2008/0089350 A1 * | 4/2008 | Liu | H04B 1/006 370/401 |
| 2016/0072544 A1 * | 3/2016 | Bosenko | H04B 5/0012 455/78 |

* cited by examiner

DIFFERENTIAL CAPACITIVE ANTENNA PORTS COEXISTENCE IN WIRELESS CAPACITIVE SIGNAL RECEPTION AND TRANSMISSION SYSTEMS AND/OR WIRELESS CAPACITIVE POWER SUPPLY TRANSMISSION SYSTEMS

This application is a national stage application under 35 U.S.C. §371 of International Application No. PCT/UA2014/000040 filed on Apr. 3, 2014, which claims priority to Ukrainain Application No. 2013-04180, filed on Apr. 3, 2013, incorporated herein by reference.

FIELD OF THE DISCLOSURE

The invention relates to the field of electronic communication systems. More specifically, the invention relates to antenna devices (ports) for high-speed, short-range, capacitive wireless devices that can be used for streaming data and electrical energy transmission between two adjacent electronic devices, modules, etc.

BACKGROUND OF THE INVENTION

Unlike the traditional radio systems, wireless communication between the various electronic devices or blocks of one electronic system, i.e. the transmission of analog and digital signals at close-millimeter or centimeter-distances, can be implemented effectively by means of the capacitive coupling. Recently, the capacitive coupling devices may become more widespread due to the appearance of more sophisticated manufacturing processes for semiconductor chips, as well as modern electronic components, which become more high-speed and are more suitable for making practical electrical circuits for wireless capacitive coupling devices.

The capacitive coupling systems, known as such in which the signals are transmitted from one conductive element to another conductive element (terminal), where two terminals are separated by a nonconductor. An electric field is created between two terminals, and as a result, an electrical potential applied to the first terminal can be detected on the second terminal through the electric field.

The capacitive coupling systems in general are such, where a transmitter has a pair of electrodes, that are separated in space, and a transmission circuit, which changes the voltage difference applied to a pair of electrodes to change the gradient of the potential of electric field generated in accordance with the data transmitted and a receiver that has a pair of electrodes separated in space and reception circuit that detects the change in potential of quasielectrostatic field to receive the data transmitted.

A significant drawback of known capacitive systems, methods and devices is that they do not solve the complex task of creating a capacitive interface that can integrate in one solution all the capabilities that are similar to the capabilities of modern high-speed wire serial differential interfaces with power supply transmission line. One of the known issues in this sense is the parasitic interference of coexisting transmitting and receiving apparatuses and capacitive wireless energy transmitting/receiving apparatuses in the same unit, along with the impact of external factors (such as electromagnetic interference, resulting in the higher number of errors in a channel and/or the actual loss of connection) on the capacitive channel (connector or antenna port) and thus on the system.

Given the current level of wireless capacitive coupling technologies, there is still a need for improved systems, methods and apparatuses of wireless communication, advanced antenna ports that can provide bi-directional data transfer at high speed with the lower level of errors during transmission, in the presence of electromagnetic interference, and that are also able to perform wireless electrical energy transmission and co-exist, being integrated into a single unit despite the parasitic relationships with each other.

SUMMARY OF THE INVENTION

The aim of the claimed invention is to design such antenna ports that will ensure the coexistence in the same antenna unit (port) of terminals for receiving apparatuses, transmitting apparatuses and apparatuses for wireless capacitive power supply reception and transmission and compensation of parasitic impacts from the transmitting terminals and the energy transmitting terminals to the receiving terminals, and thus to the receiving apparatus which can be connected with them, and in the same time will neutralize the influence of parasitic external factors—electromagnetic interference in the capacitive channel.

The technical result is achieved by developing such differential capacitive antenna ports which in one embodiment include transmitting and receiving ports, and port for wireless capacitive power supply transmission channel configured with the ability to transmit and receive the signals wirelessly and to receive and transmit power supply wirelessly.

BRIEF DESCRIPTION OF THE DRAWINGS

The following views of drawings, as well as a description of the examples of differential capacitive antenna ports in the wireless capacitive signal reception and transmission system and/or wireless capacitive power supply reception and transmission system, are given only to illustrate the invention and do not limit the scope of the rights defined by the claims of the invention:

FIG. 1b—general layout of the working surfaces of the terminals of the second side's differential capacitive antenna port for the wireless signal reception and transmission system that is compatible with the port on the scheme in FIG. 1a;

DETAILED DESCRIPTION

Presented below detailed description discloses the subjects of the invention according to the embodiments described below, but it is obvious that different modifications can be used for each disclosure and that the principles described below may be applied to other embodiments without departing from the scope of the present invention.

Thus the invention disclosed herein are not limited to the disclosed embodiments in any way but relate broadly to the principles, functions and properties disclosed herein.

The claimed subjects of the invention are the differential capacitive antenna ports in wireless capacitive signal reception and transmission systems and/or wireless capacitive power supply reception and transmission systems. Examples of the application of such antenna ports may include without limitation the capacitive interfaces for wireless coupling of two mobile phones, a mobile phone and a computer or a capacitive interface between the portative drive and a tablet or a laptop, capacitive interface for sealed modules, contactless access cards or credit/debit cards, "wireless connector", etc.

In general, the bi-directional wireless capacitive coupling interfaces comprise at least one receiving and transmitting apparatus on the each receive-transmit side that provides simultaneous reception and transmission of data signals. This apparatus can use a single or differential topology. The differential topology of receiving and transmitting apparatuses has numerous advantages over the single ended one particularly due to the specific immunity to the external factors, in particular the electromagnetic interference, that can be achieved under certain principles of design, use of a certain layout geometry for the differential capacitive terminals (capacitive antenna ports) that emit and detect the electric fields, which are the subjects of the invention.

In the wireless capacitive signal reception and transmission system the differential transmitting apparatus generates differential signals with a certain amplitude that are fed to the transmitting terminals to generate electric fields that are transmitted through the capacitive channel. In this case, the differential receiving apparatus, which is a part of the same transmitting and receiving apparatus, simultaneously reproduces parasitic signals on the receiving terminals from the electric fields of its transmitting apparatus along with the useful electric fields that reproduce the received signals from a transmitting apparatus of the other side's wireless coupling. Thus the parasitic electric fields may have a significant impact on the sum signal fed from the outputs of the receiving terminals for further processing in the receiving apparatus with the aim to restore the signal's useful data being transmitted. There are some known solutions to this problem, such as the timing separation of working modes for the receiving and transmitting apparatuses as the parts of receiving and transmitting apparatus, but it results in a significant, usually to the double reduce in speed of data reception and transmission. Besides, this solution can not be applied in the electric energy receiving and transmitting channel. It is also possible to apply signal frequency division for the receiving and transmitting channels to ensure simultaneous reception and transmission, but it requires application of the certain methods of signal processing that significantly reduce the benefits of capacitive system in such embodiment over the existing well-known radio interfaces.

Figure 1A:
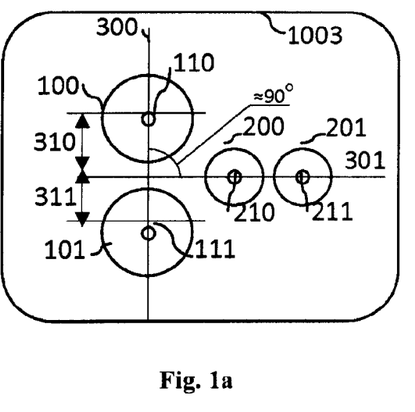
FIG. 1a—general layout of the working surfaces of the differential capacitive antenna port's terminals for wireless signal reception and transmission.

In the first embodiment, the present invention provides a differential capacitive antenna port for a wireless capacitive signal reception and transmission with the layout of the terminals on its working surface 1003 shown in FIG. 1a. The antenna port working surface 1003, as well as but not limited to the ports' working surfaces in other embodiments described herein, may be of any shape and profile, for example it can be a flat surface in the shape of a circle, square, etc., or a convex spherical working surface, providing that the appropriate antenna port of the other side, taking part in the wireless reception and transmission and compatible with it, has a concave spherical working surface. Also the working surface of the capacitive antenna port may contain the additional elements, creating a complex profile and shape, such as the guides that, in case of the mutual orientation and fixation with the compatible antenna port of the other side taking part in the wireless reception and transmission, allow to orient correctly and align the two ports to ensure the maximum overlap of the corresponding terminals of the both sides. The antenna port in the first embodiment of the present invention comprises receiving terminals 100 and 101, transmitting terminals 200 and 201. In this case the points 210 and 211 are the output feed points from the antenna port inputs to the transmitting terminals and the points 110 and 111 are the output feed points from the receiving terminals to the antenna port outputs. The elimination of the electric fields' parasitic influence that is radiated by the transmitting terminals 200 and 201 to the receiving terminals 100 and 101 is achieved by arranging an appropriate relative position of pairs of terminals. In such embodiment, when the conditional straight line 300, passing through the middle of the working surfaces of a pair of receiving terminals 100 and 101, must be approximately perpendicular to the conditional straight line 301, passing through the middle of the working surfaces of a pair of transmitting terminals 200 and 201, the compensation of parasitic electric fields occurs because these terminals fields emitted from transmitting 200 and 201 regenerate the in-phase interference signals on the receiving terminals 100 and 101. Such in-phase interference signals can be eliminated effectively in the receiving apparatus at the stage of input signals processing.

The location the signal feed/tapping points on the working surfaces of the terminal in the antenna port, which affect the amplitude and phase differences in a pair of parasitic signals being a part of differential signals generated at the receiving terminals output, is also expedient. Considering this, one more condition, which is an essential factor to achieve greater in-phase operation of parasitic signals at the outputs of the receiving terminals 100 and 101 from the electric fields of the transmitting terminals 200 and 201, consists in such a layout when the conditional straight line 300, passing through the output feed points 110 and 111 for signals from the working surfaces of a pair of receiving terminals 100 and 101, is approximately perpendicular to the conditional straight line 301, passing through the input feed points 210 and 211 for signals to the working surfaces of a pair of transmitting terminals 200 and 201. In the described embodiment of the present invention, with the layouts of the terminal working surfaces shown in FIG. 1a and FIG. 1b, the middles of the working surfaces for a pair of receiving terminals 100 and 101 coincide with the output feed points 110 and 111 for signals from the working surfaces of a pair of receiving terminals 100 and 101, and the middles of the working surfaces for the pair of transmitting terminals 200 and 201 coincides with the input feed points 210 and 211 for signals to the working surfaces of a pair of transmitting terminals 200 and 201. But this is only a special case of embodiment for the present invention.

It is also appropriate to meet two additional requirements that directly affect the maximum effect of compensation of the parasitic influence of electric fields emitted by the transmitting terminals 200 and 201 to the receiving terminals 100 and 101 in antenna port.

Firstly, as shown in FIG. 1a, if the point of intersection of the conditional straight line 300, passing through the middle of the working surfaces of one pair of receiving terminals 100 and 101, with the conditional straight line 301, passing through the middle of the working surfaces of one pair of transmitting terminals 200 and 201, will be equidistant from the middles of working surfaces of receiving terminals, i.e. the distances 310 and 311 are equal and in the same time lines 300 and 301 are perpendicular, the features of radiation pattern of transmitting terminals 200 and 201 will be used to the greatest possible extent, which will result in minimizing amplitude differences between two parasitic signals in a pair of differential signals at the outputs of receiving terminals 100 and 101.

Thus the parasitic signal can be removed more efficiently at the stages of signal processing in the receiving apparatus by conventional subtraction.

Secondly, as shown in FIG. 1a, if the point of intersection of the conditional straight line 300, passing through the output feed points 110 and 111 for signals from the working surfaces of a pair of receiving terminals 100 and 101, with the conditional straight line 301, passing through the input feed points 210 and 211 for signals to the working surfaces of a pair of transmitting terminals 200 and 201, will be equidistant from the output feed points from the working surfaces of a pair of receiving terminals, i.e. the distances 310 and 311 are equal, this will minimize the phase differences between two spurious signals in a pair of differential signals on the outputs of receiving terminals 100 and 101, in particular at points 110 and 111. Thus, the parasitic signal can be removed more efficiently at the stages of signal processing in the receiving apparatus by conventional subtraction.

Figure 1B:
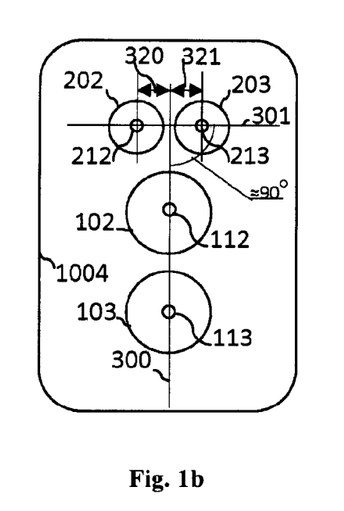

At the same time, concerning the described above embodiment of the antenna port, the arrangement of pairs of receiving and transmitting terminals on the antenna port working surface 1004 for the receiving and transmitting apparatus of the other side of wireless capacitive reception and transmission should have compatible geometry, which requires proper arrangement of terminals' working surfaces as shown in FIG. 1b.

In this case, on the antenna port receiving terminals 102 and 103 the compensation of parasitic electric fields from the other side's transmitting terminals 202 and 203 will take place mainly due to the placement of these terminals using the features of radiation pattern of transmitting terminals 202 and 203. At the same time, such arrangement meets the condition for location of pairs of antenna port terminals under which the conditional straight line 300, passing through the middle of the working surfaces of a pair of receiving terminals 102 and 103, is approximately perpendicular to the conditional straight line 301, passing through the middle of the working surfaces of a pair of transmitting terminals 202 and 203.

Thus, in case of this embodiment of a differential capacitive antenna port, with the layout of its terminal working surfaces shown in FIG. 1b, the radiation pattern of transmitting terminals 202 and 203 is such that the area with the minimum radiation will be located along the straight line perpendicular to the line segment that passes through the middle of the working surfaces of transmitting terminals 202 and 203, provided that the said line divides this segment in half at the point of intersection, i.e. the distances 320 and 321 are equal.

Thus, the area with the minimum radiation coincides with a straight line 300, besides the radiation pattern for terminals 202 and 203 is symmetrical to the straight line 300, considering the fact that the signals that are transmitted through the transmitting terminals 202 and 203 are strictly differential. 112, 113 are output feed points, and 212, 213 are input feed points (FIG. 1b).

Thus, using such arrangement at which a straight line, which is an area with the minimum radiation, coincides or nearly coincides with the straight line 300, passing through the middle of the working surfaces of receiving terminals 102 and 103, on the conductor working surfaces of receiving terminals 102 and 103 there is a mutual compensation of directed fields from the direct signal and the inverted signal emitted by the transmitting terminals 202 and 203. In this case, the parasitic signal will be significantly reduced on the outputs of the receiving terminals 102 and 103 of the differential antenna port and does not require further processing by the receiving apparatus where it is needed, as opposed to a compatible antenna port, which terminals are shown in FIG. 1a.

Figure 2:
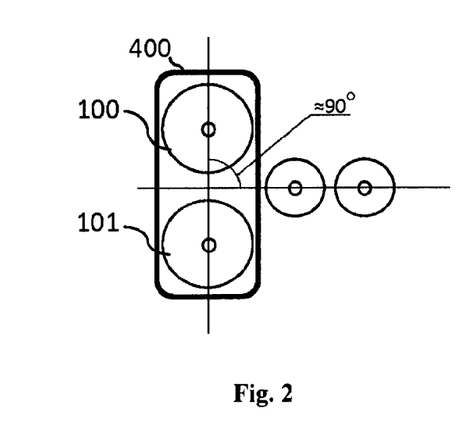
FIG. 2—general layout of the working surfaces of terminals of the differential capacitive antenna port with shielding conductive area.

In this and other embodiments of the claimed invention, it is expedient to include an element with conductive working surface 400 into the differential antenna port, providing that the working surface 400 is connected to the grounding terminal and surrounds at least the sides, as shown in FIG. 2, and/or backside of the working surface of at least one pair of receiving terminals and/or working surfaces of at least one pair of transmitting terminals. This allows you to shield the capacitive antenna port in this or that extend, depending on the design of the shielding element with antenna port into the environment. The shielding element with the conductive surface can be made, for example, in not limited number of embodiments of sheet conductive material or by coating the nonconductive structure with metal etc.

It is also expedient to use insulating protective layer made of conductive material over the working surfaces of transmitting and/or receiving terminals in the most variants of embodiments of differential capacitive antenna ports, and thus to ensure galvanic isolation, tightness and/or protection of terminals and electrical circuits of receiving and transmitting apparatuses comprising such ports from the possible external influences, as well as to protect human from the influence of the electrical signals of these apparatuses.

Figure 3A:
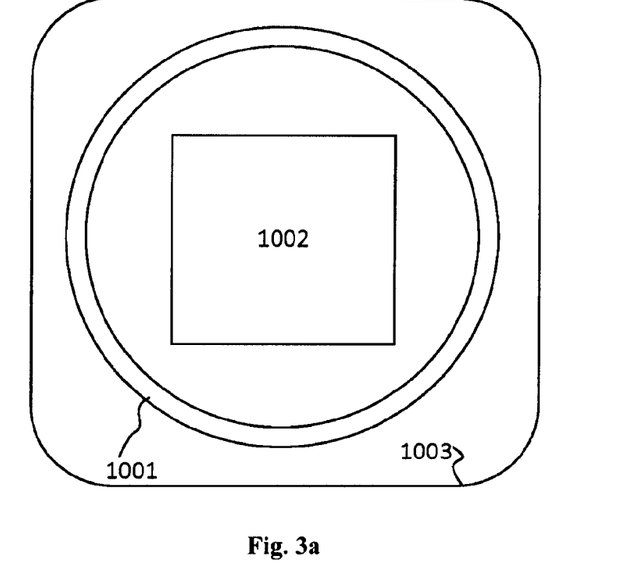
FIG. 3a—layout of the rejection groove that surrounds the working surfaces of antenna port terminals.
Figure 3B:
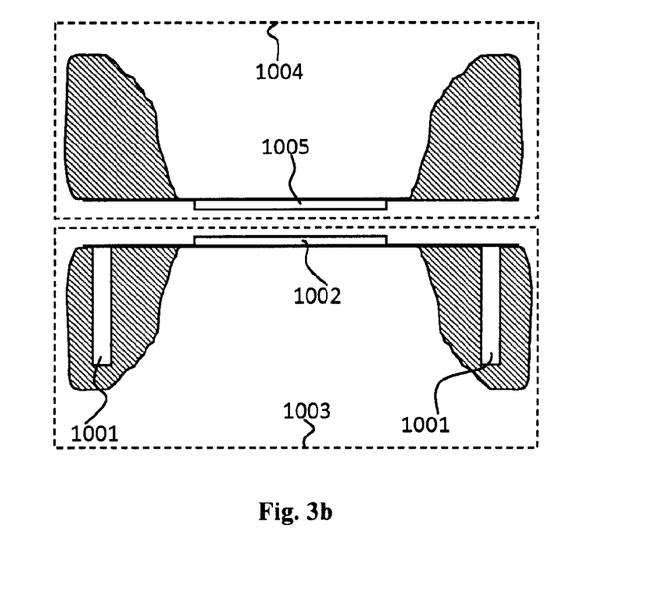
FIG. 3b—compatible layout of capacitive ports for the both sides in a wireless signal reception and transmission system and/or wireless power supply reception and transmission system, in section, in the oriented position where one of the ports comprises a rejection groove.

In some embodiments of the differential capacitive antenna ports it is also expedient to include the rejection groove 1001, shown in FIG. 3a and FIG. 3b, which is made in conductive medium and filled with nonconductive or dielectric material or with air, but not limited to that, and surrounds terminals' area 1002 of antenna port, where port's transmitting and/or receiving terminals can be placed. There are no conditions imposed on the symmetry for area 1002 or on the separate terminals with respect to the rejection groove, as well as the rejection grooves can have any contour shape for example a shape of a circle, as in this example, but not limited to that, or a shape of square, rectangular, etc.

During the wireless reception and transmission with the help of the differential capacitive antenna port of any embodiment, as disclosed in the present description, provided that the area is oriented with terminals 1002, which belongs to the port 1003, and comprises the rejection groove with respect to the compatible port 1004 of the other side taking part in the reception and transmission with respect to the area comprising terminals 1005, there are no conditions imposed except for there should be conductive material opposite to the rejection groove, as shown in FIG. 3b. With such position of the rejection groove, the electromagnetic wave existing in the space between the ports 1003 and 1004 while passing by the rejection groove can be mutually compensated with a wave, which passes through the rejection groove due to the currents flow. Full compensation may occur for waves with frequencies that have phasing constant $(2n-1)*180°$, where n is any integer number greater than 0, at the double depth of the rejection groove 1001.

With the different variations of the rejection groove's width one can achieve complete or nearly complete compensation of electromagnetic wave beyond the rejection groove in the direction of propagation of electromagnetic wave. With the frequency deviation from the value at which the full compensation takes place with the help of the rejection groove, the wave amplitude that has passed through the groove increases gradually. To extend the working range of shielding frequency a number of rejection grooves can be used, where each one can be designed for a specific frequency/frequency range.

Also, for most embodiments, it is expedient to include a retainer in the structure of differential antenna ports, configured for fixation in oriented position of the corresponding antenna ports, to ensure the necessary conditions for the existence of capacitive coupling between the sides' ports participating in reception and transmission, and thus to enable the wireless capacitive reception and transmission between the sides' antenna ports. Apparatus fixation can be made in any known way, for example, by means of a magnetic field using permanent magnets or electromagnets, or by using a vacuum device, mechanical fixing etc.

The described above and not limited in any way possible embodiment of the differential capacitive antenna port for a wireless capacitive signal reception and transmission can also be used simultaneously for power supply reception and transmission. In this case, electrical energy reception and transmission can be performed through the same receiving and transmitting terminals, used for reception and transmission of data signals. In this embodiment of the antenna port, power supply reception and transmission takes place in the data receiving and transmitting channels by combining existing variants of receiving and transmitting apparatuses with receiving and transmitting apparatus for power supply transmission using certain principles, circuits and methods for this, but their disclosure is beyond the scope of this description. This embodiment of the antenna port includes receiving and transmitting terminals configured to detect and create respectively not only electric fields that represent the transmitted signals, but also to detect and create electrical fields that represent the signals of power supply channel that imposes certain requirements on these terminals, such as a relatively larger physical sizes of the working surfaces of the terminals, as compared to the physical sizes of the working surfaces of the terminals used only for signal reception and transmission. The increase of the physical size of working surfaces of terminals is needed to create a larger capacity between receiving and transmitting terminals of the both sides of wireless coupling. Also, such terminals must be configured to work with high voltage signals. Thus, it requires the additional appropriate design for conductive area and insulation around the terminals.

Figure 4A:
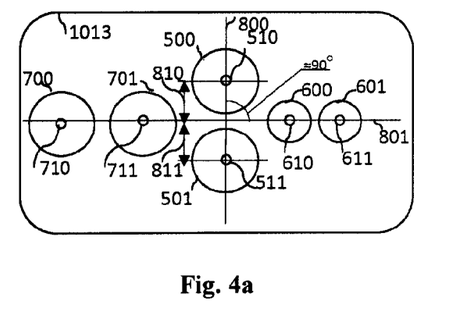
FIG. 4a—general layout of the working surfaces of the terminals of the differential capacitive antenna port for a wireless signal reception and transmission system with the channel for wireless power supply reception and transmission.

In the second embodiment of the present invention, a differential capacitive antenna port for the wireless capacitive signal reception and transmission with the channel of wireless power supply transmission, where the layout of the terminals on its working surface 1013 is shown in FIG. 4a, comprises the receiving terminals 500 and 501, the transmitting terminals 600 and 601 and electrical energy transmitting terminals 700 and 701. In this case, the points 610 and 611 are the input feed point for signals from the antenna port inputs to the transmitting terminals, and the points 510 and 511 are the output feed points for signals from the receiving terminals to the outputs of the antenna port, and points 710 and 711 are input feed points for signals to the energy transmitting terminals.

Provided that, the elimination of electric fields parasitic influence radiated by the transmitting terminals 600, 601, 700, and 701 to the receiving terminals 500 and 501, is achieved by the respective relative position of pairs of terminals. In case of such positioning, the conditional straight line 800, passing through the middle of the working surfaces of a pair of receiving terminals, should be approximately perpendicular to the conditional straight line 801, passing through the middle of the working surface of a pair of transmitting terminals and energy transmitting terminals, the compensation of parasitic electric fields takes place because the fields from transmitting terminals 600, 601, 700, and 701 regenerate in-phase interference signals on the receiving terminals 500 and 501. These in-phase signals can be eliminated effectively in the receiving apparatus at the stage of input signals processing.

The location of input/output feed points, which affect the amplitude and phase differences in a pair of spurious signals being a part of differential signals generated on the output of the receiving terminals, on the terminals' working surfaces in antenna port is also essential. Thus, one more condition, meeting which is an essential factor to achieve greater in-phase operation of spurious signal on the outputs of receiving terminals 500 and 501 from the electric fields of transmitting terminals 600 and 601 and the electrical energy transmitting terminals 700 and 701, is such a scheme of relative position of terminals where conditional straight line 800, passing through the output feed points 510 and 511 from the working surfaces of a pair of receiving terminals, should be approximately perpendicular to the conditional straight line 801, passing through the input feed points 610 and 611 to the working surfaces of a pair of transmitting terminals and input feed points 710 and 711 for signals from power supply channels to the working surfaces of a pair of energy transmitting terminals.

Figure 4B:
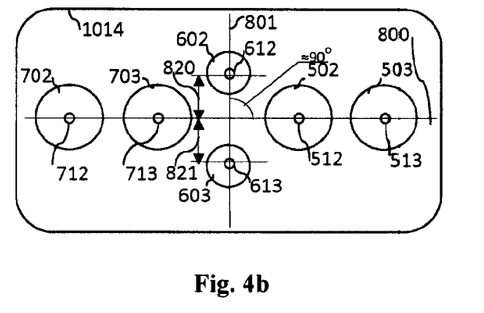
FIG. 4b—general layout of the working surfaces of terminals for the differential capacitive antenna port with the channel of wireless power supply reception and transmission of the other side of wireless capacitive signal reception and transmission that is compatible with the port in FIG. 4.
Figure 5:
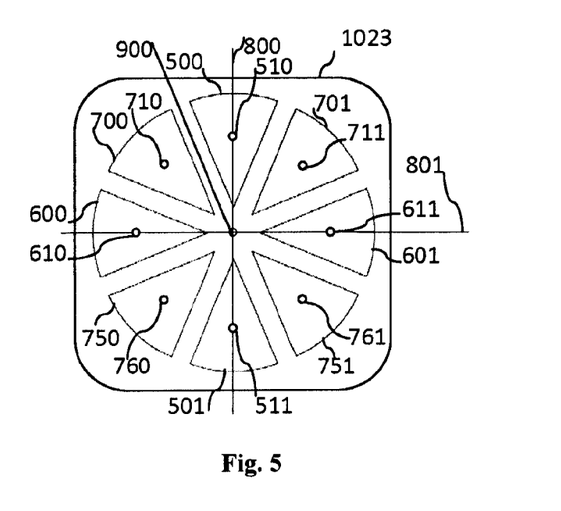
FIG. 5—general layout with centrosymmetric arrangement of the working surfaces of terminals for the differential capacitive antenna port for a wireless signal reception and transmission with the channel of wireless power supply reception and transmission.

In the embodiment of the present invention, the layouts of the terminal working surfaces of which are shown in FIG. 4a and FIG. 4b , the middles of the working surfaces of pairs of receiving terminals 500 and 501 or 502 and 503 coincide respectively with the output feed points 510 and 511 or 512 and 513 for signals from the working surfaces of these pairs of receiving terminals, the middles of working surfaces of pairs of transmitting terminals 600 and 601 or 602 and 603 coincide respectively with input feed points 610 and 611 and 612 and 613 for signals to the working surfaces of these pairs of transmitting terminals, the middles of the working surfaces of a pair of energy transmitting terminals 700 and 701 coincide with the power supply channel input feed points 710 and 711 to the energy transmitting terminals, and the middles of working surfaces of pair of energy receiving terminals 702 and 703 coincide with the power supply channel output feed points 712 and 713 from the energy receiving terminals. But this is only a special case of the present invention.

It is also expedient to meet two additional requirements that directly affect the maximum effect of compensation of parasitic influence from electric fields radiated in the antenna port by the transmitting terminals 600 and 601 and the energy transmitting terminals 700 and 701 to the receiving terminals 500 and 501.

Firstly, as shown in FIG. 4*a*, if the point of intersection for the conditional straight line 800, passing through the middle of the working surfaces of a pair of receiving terminals 500 and 501, with the conditional straight line 801, passing through the middle of the working surfaces of a pair of transmitting terminals 600 and 601 and a pair of energy transmitting terminals 700 and 701, is equidistant from the middle of working surfaces of a pair of receiving terminals, i.e. the distances 810 and 811 are equal, while meeting the requirements of perpendicularity of conditional straight lines 800 and 801, the feature of radiation pattern of transmitting terminals 600 and 601 will be used to the greatest possible extent, that will result in minimizing amplitude differences between two spurious signals in a pair of differential signals at the outputs of receiving terminals 500 and 501. Thus, the parasitic signal can be removed more efficiently in the receiving apparatus at the stages of signal processing.

Secondly, as shown in FIG. 1*a*, if the point of intersection of the conditional straight line 800, passing through the output feed points 510 and 511 from the working surfaces of a pair of receiving terminals, with the conditional straight line 801, passing through the input feed points 610 and 611 to the working surfaces of a pair of transmitting terminals and through the power supply channel input feed points 710 and 711 to the working surfaces of a pair of transmitting terminals, will be equidistant from the output feed points from the working surfaces of a pair of receiving terminals, i.e. the distances 810 and 811 are equal, this will minimize the phase differences between two parasitic signals in a pair of differential signals on the outputs of receiving terminals 500 and 501, connected to points 510 and 511. Thus, the parasitic signal can be removed more efficiently in the receiving apparatus by conventional subtraction at the stages of signal processing.

At the same time, concerning the described above embodiment of the antenna port, the arrangement of pairs of receiving terminals, transmitting terminals, and energy receiving and transmitting terminals with wireless power supply channel of the other side of wireless capacitive reception and transmission should have compatible geometry, which requires proper arrangement of terminals' working surfaces on the port's working surface 1014 as shown in FIG. 4*b*. In this case, the compensation on the antenna port's receiving terminals 502 and 503, as well as the compensation for energy receiving terminals, of parasitic electric fields from this side's transmitting terminals 602 and 603 will take place mainly due to the placement that uses the features of radiation pattern of transmitting terminals 602 and 603. At the same time, such arrangement meets the condition for location of pairs of antenna port terminals under which the conditional straight line 800, passing through the middle of the working surfaces of a pair of receiving terminals 502 and 503 and through the energy receiving terminals 702 and 703, should be approximately perpendicular to the conditional straight line 801, passing through the middle of the working surfaces of a pair of transmitting terminals 602 and 603. Thus, in case of this embodiment of a differential capacitive antenna port with a wireless power supply reception channel, with the layout of its terminal working surfaces on a working surface 1014 shown in FIG. 4*b*, the radiation pattern for the pair of transmitting terminals 602 and 603 is such that the area with the minimum radiation will be located along the straight line perpendicular to the line segment that passes through the middle of the working surfaces of transmitting terminals 602 and 603, provided that the said line divides this segment in half at the point of intersection, i.e. the distances 820 and 821 are equal. Thus, the area with the minimum radiation coincides with a straight line 800, besides the radiation pattern for terminals 802 and 803 is symmetrical to the straight line 800, considering the fact that the signals that are transmitted through the transmitting terminals 602 and 603 are strictly differential. Thus, using such arrangement under which a straight line representing the area with the minimum radiation coincides or nearly coincides with the straight line 800, passing through the middle of the working surfaces of receiving terminals 502 and 503 and energy receiving terminals 702 and 703, on the conductive working surfaces of receiving terminals 502, 503, 702, and 703 there is a mutual compensation of directed fields from the direct signal and the inverted signal emitted by the transmitting terminals 602 and 603. As result, the parasitic signal will be significantly reduced on the outputs of the receiving terminals 502 and 503 of the differential antenna port with power supply channel and does not require further processing by the receiving apparatus where it is needed, as opposed to a compatible antenna port with power supply channel, whose terminals are shown in FIG. 4*a*.

In this and other embodiments, it is expedient to include an element with conductive working surface into the differential antenna port with power supply channel, providing that the working surface is connected to the grounding terminal and surrounds at least the sides and/or backside of the working surface of at least one pair of receiving terminals and/or working surfaces of at least one pair of transmitting terminals.

It is also expedient to use insulating protective layer made of conductive material over the working surfaces of transmitting and/or receiving terminals and/or energy receiving terminals and/or energy transmitting terminals in the most variants of embodiments of differential capacitive antenna ports with power supply channel, and thus to ensure galvanic isolation, tightness and/or protection of terminals and electrical circuits of apparatuses comprising such ports from the possible external influences, as well as to protect human from the influence of the electrical signals of these apparatuses.

In some embodiments of the differential capacitive antenna ports with power supply channel it is also expedient to include rejection groove 1001, shown in FIG. 3*a* and FIG. 3*b*, which is made in conductive medium and filled with nonconductive or dielectric material or with air, but not limited to that, and surrounds terminals' area 1002 of antenna port, where port's transmitting and/or receiving terminals and/or energy receiving terminals and/or energy transmitting terminals can be placed.

Also, for most embodiments, it is expedient to include a retainer in the structure of differential antenna ports with power supply channel, configured for fixation in oriented position of the corresponding antenna ports, to ensure the necessary conditions for the existence of capacitive coupling between the sides' ports participating in data stream and energy reception and transmission, and thus to enable the wireless capacitive reception and transmission between sides' antenna ports. Apparatus fixation can be provided in any known way, for example, by means of a magnetic field using permanent magnets or electromagnets, or by using a vacuum device, mechanical fixing etc.

Figure 6:
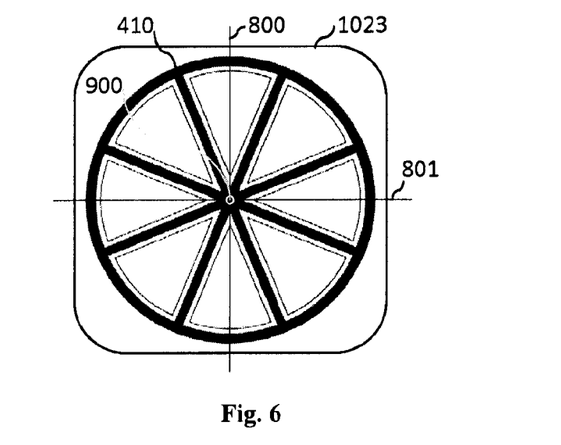
FIG. 6—general layout with centrosymmetric arrangement of the working surfaces of terminals for the differential capacitive antenna port for a wireless signal reception and transmission with the channel of wireless power supply reception and transmission with the shielding conductive area.

In the third embodiment of the present invention, a differential capacitive antenna port for a wireless capacitive signal reception and transmission with the channel of wireless power supply reception and transmission, where the layout of the terminals on its working surface 1023 is shown in FIG. 6, comprises the receiving terminals 500 and 501, the transmitting terminals 600 and 601, and two pairs of electrical energy transmitting terminals 700 and 701, 750 and 751. In this case, the points 610 and 611 are the input feed point for signals from the antenna port inputs to the transmitting terminals, and points 510 and 511 are the output feed point for signals from the receiving terminals to the outputs of the antenna port, and points 710 and 711, 760 and 761 are input feed points for signals to the energy transmitting terminals. 900 is the center of symmetry.

Provided that, the elimination of electric fields parasitic influence radiated by the transmitting terminals 600, 601, 700, 701, 750 and 751 to the receiving terminals 500 and 501 is achieved by the respective relative position of pairs of terminals. In case of such positioning, when the conditional straight line 800, passing through the middle of the working surfaces of pair of receiving terminals, is approximately perpendicular to the conditional straight line 801, passing through the middle of the working surfaces of pair of transmitting terminals, the compensation of power supply channel parasitic electric fields takes place because the fields from transmitting terminals 600 and 601, due to their centrosymmetry will have the radiation pattern with the area with the minimum radiation that will coincide with the conditional straight line 800, and as a result the interference signals will be minimized with regard to amplitude and in-phase operation.

The location of input/output feed points, which affect phase differences in a pair of parasitic signals being a part of differential signals generated at the output of the receiving terminals, on the terminals' working surfaces in antenna port is also essential. Thus, one more condition, meeting which is an essential factor to achieve greater in-phase operation of parasitic signal on the outputs of receiving terminals 500 and 501 from the electric fields of transmitting terminals 600 and 601, is such a scheme where conditional straight line 800, passing through the output feed points 510 and 511 from the working surfaces of a pair of receiving terminals, should be approximately perpendicular to the conditional straight line 801 passing through the input feed points 610 and 611 to the working surfaces of a pair of transmitting terminals. As for the neutralization the impact from radiation of energy transmitting terminals 700, 701, 750 and 751 on the receiving terminals 500, 501, in this embodiment it is achieved through the implementation of the condition that the conductive working surface of all terminals must be centrosymmetric with regard to the intersection point of conditional straight lines 800 and 801, providing that the straight line 800, passing through the output feed points or the middles of working surfaces of a pair of receiving terminals 500 and 501, is approximately perpendicular to the straight line 801, passing through the input feed points or the middles of the working surfaces of a pair of transmitting terminals 600 and 601.

Thus, due to its centrosymmetry any shape of work surface for both pairs of energy transmitting terminals will have a such radiation pattern that one area with the minimum radiation will coincide with conditional straight line 800, and in result there will be the mutual compensation of the directed fields from the direct signal and the inverted electrical signal of both pairs, that is emitted by energy transmitting terminals 700, 701, 750 and 751, and the parasitic interference signal on the outputs of the receiving terminals 500 and 501 of the differential antenna port with power supply channel will be greatly reduced without further processing by a receiving apparatus, unlike antenna port with power supply channel, that is compatible with port 1023, where such processing by conventional subtraction in the receiving apparatus is required.

Also, given that the second minimum area in the present embodiment will coincide with the conditional straight line 801, there will be mutual compensation of the directed fields from the direct signal and the inverted electrical signal of both pairs radiated by energy transmitting terminals 700, 701, 750 and 751, and on transmitting terminals 600 and 602, that will protect the transmitting apparatus from the overloads in reception and transmission apparatus of wireless capacitive coupling system, which can be connected to this antenna port.

In this and other embodiments, it is expedient to include an element with conducting working surface into the differential antenna port with wireless energy reception and transmission channel, as, for example, provided in not limited embodiment described above, where the element 410, with the working surface connected to the grounding terminal and surrounding at least the sides and/or backside of the working surface of at least one pair of receiving terminals and/or working surfaces of at least one pair of transmitting terminals, was included in 1023.

It is also expedient to use insulating protective layer made of conductive material over the working surfaces of transmitting and/or receiving terminals and/or energy receiving terminals and/or energy transmitting terminals in the most variants of embodiments of differential capacitive antenna ports with power supply channel, and thus to ensure galvanic isolation, tightness and/or protection of terminals and electrical circuits of apparatuses comprising such ports from the possible external influences, as well as to protect human from the influence of the electrical signals of these apparatuses.

In some embodiments of the differential capacitive antenna ports with power supply channel it is also expedient to include rejection groove 1001, which is made in conductive medium and filled with nonconductive or dielectric material or with air, but not limited to that, and surrounds terminals' area of antenna port, where port's transmitting and/or receiving terminals and/or energy receiving terminals and/or energy transmitting terminals can be placed.

Also, for most embodiments, it is expedient to include a retainer in the structure of differential antenna ports with power supply channel, configured for fixation in oriented position of the corresponding antenna ports, to ensure the necessary conditions for the existence of capacitive coupling between the sides' ports participating in data stream and energy reception and transmission, and thus to enable the wireless capacitive reception and transmission between sides' antenna ports. Apparatus fixation can be provided in any known way, for example, by means of a magnetic field using permanent magnets or electromagnets, or by using a vacuum device, mechanical fixing etc.

In the same time taking into consideration the specific embodiments and application of the invention illustrated and described herein, it is necessary to bear in mind that the invention is not limited to the exact configuration and components disclosed herein. Conditions, descriptions and drawings are used herein only with the purpose of illustration and do not imply any restrictions. Various modifications, changes and variations which will be apparent to the experts can be made in design, operation, and details of apparatuses, methods and systems of the present invention disclosed herein without departing from the scope of the invention.

Differential capacitive antenna ports in a wireless capacitive signal reception and transmission systems and/or wireless capacitive power supply reception and transmission systems according to the claimed invention ensure the coexistence of terminals of receiving apparatuses, transmitting apparatuses and wireless capacitive power supply receiving and transmitting apparatuses in the same antenna port and a high degree of compensation of parasitic influence from the transmitting terminals and energy transmitting terminals to the receiving terminals, and thus to the receiving apparatus which can be connected with them, in the same time neutralizing effectively parasitic effects of external factors—electromagnetic interference in the capacitive channel.

What is claimed is:

1. A differential capacitive antenna port for wireless capacitive signal reception and transmission, comprising:
a capacitive transmission port configured to generate electric fields that represent transmitted signals with at least one pair of transmitting terminals, with conductive working surfaces connected to port inputs at input feed points, and
a capacitive reception port configured to detect electric fields that represent transmitted signals with at least one pair of receiving terminals, with conductive working surfaces connected to port outputs at output feed points, wherein conductive working surfaces of capacitive ports are positioned such that a conditional straight line, crossing a middle of the working surfaces of at least one pair of receiving terminals, is approximately perpendicular to a conditional straight line, passing through a middle of the working surfaces of at least one pair of transmitting terminals, or such that a conditional straight line, passing through the output feed points from the working surfaces of at least one pair of receiving terminals, is approximately perpendicular to a conditional straight line passing through the signals feed points to the working surfaces of at least one pair of transmitting terminals.

2. The antenna port of the claim 1, wherein the capacitive transmission port is further configured to generate electric fields that represent power supply signals, and the capacitive reception port is further configured to detect electric fields that represent the power supply signals.

3. The antenna port of the claim 1, wherein an intersection point of the conditional straight line, passing through the middle of the working surfaces of at least one pair of receiving terminals, with the conditional line, passing through the middle of the working surfaces of at least one pair of transmitting terminals, is substantially equidistant from the middle of the working surfaces of at least one pair of the receiving terminals or from the middle of the surface of at least one pair of transmitting terminals.

4. The antenna port of claim 1, wherein an intersection point of the conditional straight line, passing through the output feed points from the working surfaces of at least one pair of receiving terminals, with the conditional straight line, passing through the input feed points to the working surfaces at least one pair of transmitting terminals, is substantially equidistant from the output feed points from the working surfaces of at least one pair of receiving terminals or input feed points to the working surfaces of at least one pair of transmitting terminals.

5. The antenna port of claim 1, further comprising a conducting surface that is connected to a ground circuit and surrounds at least sides and/or a backside of the working surfaces of at least one pair of receiving terminals and/or working surfaces of at least one pair of transmitting terminals.

6. The antenna port of claim 1, further comprising a layer of non-conductive material that substantially covers the working surfaces of at least one pair of receiving or transmitting terminals.

7. The antenna port of claim 1, further comprising at least one rejection groove, made of conductive material and filled with dielectric medium, which partially or completely surrounds the working surface of at least one pair of receiving or transmitting terminals.

8. The antenna port of claim 1, further comprising a retainer configured to fix the port in an oriented position with a corresponding differential capacitive antenna port on an opposing side of capacitive wireless reception/transmission.

9. A differential capacitive antenna port for wireless capacitive signal reception and transmission, with a channel of wireless power supply reception and transmission, comprising:
a capacitive transmission port configured to generate electric fields that represent transmitted signals with at least one pair of transmitting terminals with conducting working surfaces connected to port inputs at input feed points,
a capacitive reception port configured to detect the electric fields that represent transmitted signals with at least one pair of receiving terminals, with conducting work surfaces connected to port outputs at output feed points, and one of capacitive ports of power supply channels, including:
a capacitive transmission port of the power supply channel configured to generate electric fields that represent the signals of the power supply channel with at least one pair of energy transmitting terminals with the conductive working surfaces connected to the power supply channel port inputs at the output feed points, or
a capacitive reception port of the power supply channel configured to detect electric fields that represent signals of the power supply channel with at least one pair of energy receiving terminals with the conductive working surfaces connected to the power supply channel port outputs at the output feed points, wherein the conductive working surfaces of capacitive ports' terminals are positioned such that a conditional straight line, passing through a middle of the working surfaces of at least one pair of receiving terminals, is approximately perpendicular to a conditional straight line, passing through a middle of the working surfaces of at least one pair of transmitting terminals and a middle of working surfaces of at least one pair of energy transmitting terminals, or a conditional straight line, passing through the middle of the working surfaces of at least one pair of transmitting terminals, is approximately perpendicular to a conditional straight line, passing through the middle of the working surfaces of at least one pair of the receiving terminals and the middle of working surfaces of at least one pair of energy receiving terminals.

10. The antenna port of the claim 9, wherein the conducting working surfaces of the capacitive ports terminals are positioned in such a way to ensure that a conditional straight line, passing through the output feed points from the working surfaces of at least one pair of receiving terminals, is approximately perpendicular to a conditional straight line, passing through the input feed points to the working surfaces of at least one pair of transmitting terminals and input feed points to the working surfaces of at least one pair of energy transmitting terminals, or a conditional straight line, passing through the input feed points to the working surfaces of at least one pair of transmitting terminals, is approximately perpendicular to a conditional straight line, passing through the output feed points from the working surfaces of at least one pair of receiving terminals and the output feed points from working surfaces of at least one pair of energy receiving terminals.

11. The antenna port of claim 9, further comprising a conductive surface that is connected to a ground circuit and surrounds at least sides and/or a backside of the working surfaces of at least one pair of receiving terminals and/or working surfaces of at least one pair of transmitting terminals and/or working surfaces of at least one pair of terminals of the power supply channel capacitive port.

12. The antenna port of claim 9, further comprising a layer of non-conductive material that substantially covers the working surfaces of at least one pair of receiving or transmitting terminals.

13. The antenna port of claim 9, further comprising at least one rejection groove, made of conductive material and filled with dielectric medium, which partially or completely surrounds the working surface of at least one pair of receiving or transmitting terminals.

14. The antenna port of claim 9, further comprising a retainer configured to fix the port in an oriented position with a corresponding differential capacitive antenna port on an opposing side of capacitive wireless reception/transmission.

15. A differential capacitive antenna port for wireless capacitive signal reception and transmission, with a channel of wireless power supply reception and transmission, comprising:
a capacitive transmission port configured to generate electric fields that represent transmitted signals with at least one pair of transmitting terminals with conducting working surfaces connected to port inputs at input feed points,
a capacitive reception port configured to detect the electric fields that represent transmitted signals with at least one pair of receiving terminals, with conducting working surfaces connected to port outputs at output feed points, and
one of power supply channel capacitive ports, including:
a capacitive transmission port of the power supply channel configured to generate electric fields that represent signals of the power supply channel with at least one pair of energy transmitting terminals from the conductive working surfaces connected to the power supply channel port inputs at the output feed points, or
a capacitive reception port of the power supply channel configured to detect electric fields that represent signals of the power supply channel with at least one pair of energy receiving terminals with the conductive working surfaces connected to the power supply channel port outputs at the output feed points, wherein all pairs of conductive working surfaces, their input feed points and output feed points are positioned in the capacitive port such that a conditional straight line, passing through the output feed points or middles of the working surfaces of at least one pair of receiving terminals, is approximately perpendicular to a conditional straight line passing through the input feed points or middles of the working surfaces of at least one pair of transmitting terminals, and conductive working surfaces of all terminals, their input feed points and output feed points are centrosymmetric relative to an intersection point of two conditional straight lines.

16. The antenna port of claim 15 further comprising a conductive surface that is connected to a ground circuit and surrounds at least sides and/or a backside of the working surfaces of at least one pair of receiving terminals and/or working surfaces of at least one pair of transmitting terminals and/or working surfaces of at least one pair of terminals of the power supply channel capacitive port.

17. The antenna port of claim 15, further comprising a layer of non-conductive material that substantially covers the working surfaces of at least one pair of receiving or transmitting terminals.

18. The antenna port of claim 15, further comprising at least one rejection groove, made of conductive material and filled with dielectric medium, which partially or completely surrounds the working surface of at least one pair of receiving or transmitting terminals.

19. The antenna port of claim 15, further comprising a retainer configured to fix the port in an oriented position with a corresponding differential capacitive antenna port on an opposing side of capacitive wireless reception/transmission.

* * * * *